(12) United States Patent
Moon et al.

(10) Patent No.: US 9,288,072 B2
(45) Date of Patent: Mar. 15, 2016

(54) METHOD FOR TRANSMITTING CONTENTS IN A SMART HOME ENVIRONMENT

(71) Applicant: KOREA ELECTRONICS TECHNOLOGY INSTITUTE, Seongnam-si, Gyeonggi-do (KR)

(72) Inventors: Jae Won Moon, Seoul (KR); Kyung Won Kim, Seoul (KR); Tae Beom Lim, Yongin-si (KR); Kwang Sue Chung, Seongnam-si (KR); Dong Chil Kim, Seoul (KR); Doo Yeol Yoon, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 281 days.

(21) Appl. No.: 13/866,628

(22) Filed: Apr. 19, 2013

(65) Prior Publication Data

US 2014/0164558 A1 Jun. 12, 2014

(30) Foreign Application Priority Data

Dec. 7, 2012 (KR) .................. 10-2012-0142115

(51) Int. Cl.
| | |
|---|---|
| *G06F 15/16* | (2006.01) |
| *H04L 12/28* | (2006.01) |
| *H04L 29/08* | (2006.01) |
| *H04L 12/26* | (2006.01) |
| *H04L 12/927* | (2013.01) |
| *H04L 12/801* | (2013.01) |

(52) U.S. Cl.
CPC .......... *H04L 12/2812* (2013.01); *H04L 12/281* (2013.01); *H04L 12/283* (2013.01); *H04L 67/303* (2013.01); *H04L 43/0829* (2013.01); *H04L 43/0852* (2013.01); *H04L 43/0882* (2013.01); *H04L 47/14* (2013.01); *H04L 47/808* (2013.01)

(58) Field of Classification Search
CPC ... H04L 12/2803; H04L 47/14; H04L 47/808; G06T 3/40; G05B 19/418
USPC .................................................. 715/736, 734
See application file for complete search history.

(56) References Cited

U.S. PATENT DOCUMENTS

| | | | |
|---|---|---|---|
| 2006/0029085 A1 | 2/2006 | Booman et al. | |
| 2007/0079340 A1* | 4/2007 | McEnroe | 725/78 |
| 2008/0052387 A1* | 2/2008 | Heinz et al. | 709/223 |
| 2009/0132923 A1* | 5/2009 | Han et al. | 715/717 |
| 2011/0046755 A1* | 2/2011 | Sung et al. | 700/90 |
| 2011/0295974 A1* | 12/2011 | Kashef et al. | 709/217 |
| 2014/0105561 A1* | 4/2014 | Chen et al. | 386/200 |
| 2014/0130070 A1* | 5/2014 | Meare | 725/9 |

FOREIGN PATENT DOCUMENTS

| | | |
|---|---|---|
| KR | 10-2012-0047624 A | 5/2012 |
| WO | 0161932 A1 | 8/2001 |

* cited by examiner

*Primary Examiner* — Douglas Blair
(74) *Attorney, Agent, or Firm* — Sughrue Mion, PLLC

(57) ABSTRACT

When a user wants to move or share the contents, information on network status, a position of a terminal, and a property of the terminal is collected and displayed intuitively to the user. Then, quality of the contents is adjusted in accordance with selection of the user adaptively. The contents can be displayed through the selected terminal with adaptively adjusted quality based on the information on network status, the position of a terminal, and the property of the selected terminal.

9 Claims, 3 Drawing Sheets

METHOD FOR TRANSMITTING CONTENTS IN A SMART HOME ENVIRONMENT

CROSS-REFERENCE TO RELATED APPLICATIONS

This application claims priority under 35 U.S.C. §119 to Korean Patent Application No. 10-2012-0142115, filed on Dec. 7, 2012, in the Korean Intellectual Property Office, the disclosure of which is incorporated herein by reference in its entirety

TECHNICAL FIELD

The present invention relates to a method for transmitting contents in a smart home environment, and more particularly, to a method for transmitting contents seamlessly to provide a user with a convenient media contents service in a smart home environment.

BACKGROUND

As individuals use various smart terminals, demands for seamlessly reproducing or sharing one same content in several terminals have been increasing. For example, a user may wish to watch video contents seamlessly, which he or she has been watching outside the home through a smartphone, using a smart TV or a tablet PC in a living room when he or she comes back home.

In this regard, a multi-screen technology which supports seamless use of the contents between various smart terminals attracts attention. However, services which are currently being used are provided only thorough a specific mobile terminal based on a single service platform so that there are restrictions on seamless streaming of multimedia contents as the status of the connected network changes and a user terminal moves. Further, it is hard to know properties (resolution, a performance of a CPU, or a status of a network) of a terminal in which the contents to be moved, which sometimes causes the contents to be disconnected or a high quality service not to be available.

Therefore, a technology that interlocks various terminals in a smart home environment and provides convenience to the user is required.

SUMMARY

The present invention has been made in an effort to provide a method capable of seamlessly reproducing multimedia contents between various terminals in a smart home environment.

Further, the present invention provides a method for reproducing contents by intuitively displaying various context information (properties of terminals or network status) required to move and reproduce the contents to the user to improve the convenience of the user.

Further, the present invention provides a method for reproducing contents which adaptively adjusts media contents based on context information collected when the contents move between terminals to provide a high quality media service to the user.

In other to solve the above problems, the present invention collects information on a network status, a location of a terminal, and a property of the terminal when a user wants to move or share the contents, intuitively displays the information on network status, the location of a terminal, and the property of a terminal to the user, and adaptively adjusts a quality of the contents in accordance with selection of the user to display the contents through a selected terminal.

An exemplary embodiment of the present invention, a method for transmitting contents in a smart home environment includes: measuring a network status of a terminal device included in a home network which configures the smart home environment; recognizing terminal information including a location and a property of the terminal device; and displaying the terminal device, which is capable of reproducing the contents, on a screen of a mobile terminal through which a user is currently reproducing contents based on the network status and the terminal information.

Here, the method may further include, if the user selects any one of the displayed terminal devices, adjusting a quality of the contents in accordance with the network status and the terminal information of the selected terminal device.

The method may further include reproducing the contents having a quality adjusted in accordance with the network status and the terminal information of the terminal device selected through the selected terminal device.

The location of the terminal device may be recognized using description information of UPnP.

The property of the terminal device may include a type, a resolution, a performance of a CPU, a storage size of the terminal device.

In the displaying of the terminal device, the terminal device may be displayed with a size which varies depending on a resolution of the terminal device.

The network status may include a packet loss rate, delay, or an available bandwidth.

In the displaying of the terminal device, a line which connects the mobile terminal with the terminal device may be displayed, and the line may be displayed with a thickness which varies in accordance with the network status of the terminal device.

Other features and aspects will be apparent from the following detailed description, the drawings, and the claims.

DETAILED DESCRIPTION OF EMBODIMENTS

Figure 1:
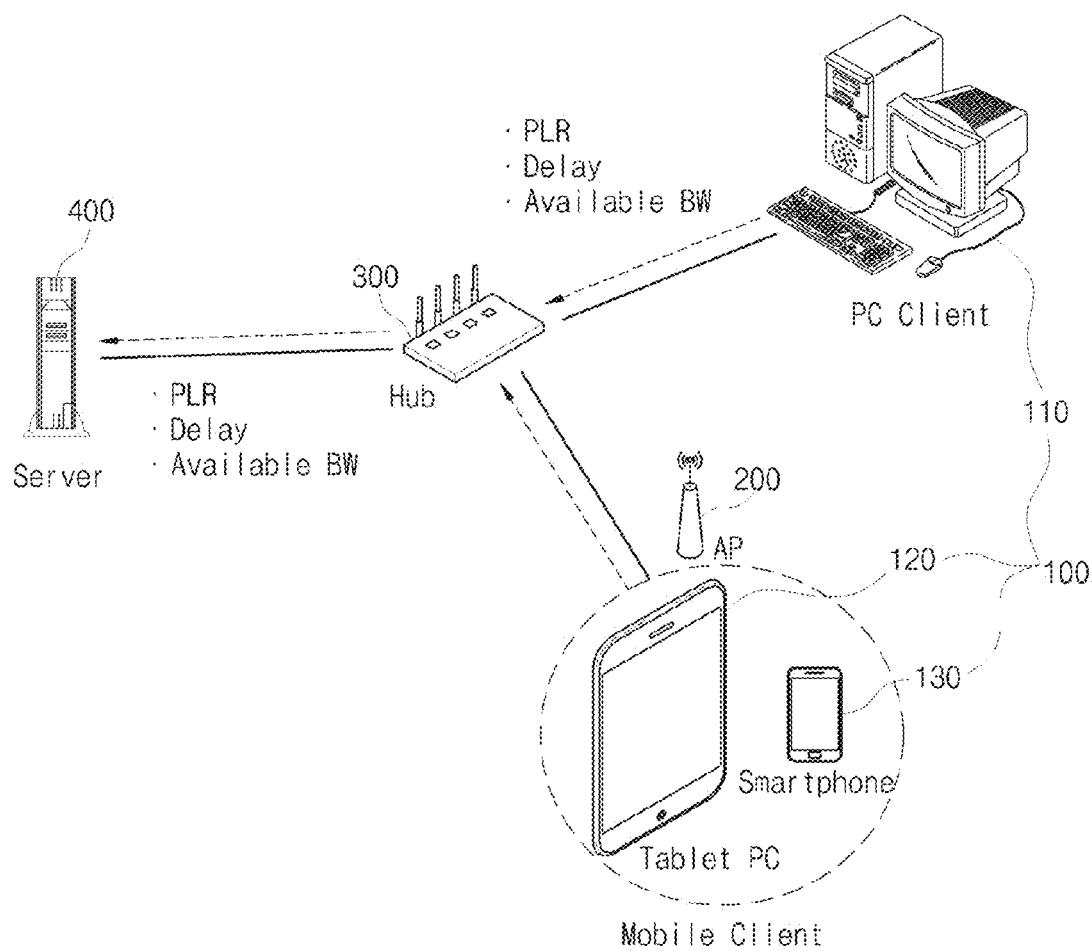
FIG. 1 illustrates an entire configuration of a system for transmitting contents in a smart home environment according to an exemplary embodiment of the present invention and a process of measuring a network status in a method for transmitting contents according to the exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Hereinafter, a method and a system for transmitting contents in a smart home environment according to an exemplary embodiment of the present invention will be described in detail with reference to accompanying drawings.

FIG. 1 illustrates an entire configuration of a system for transmitting contents in a smart home environment according to an exemplary embodiment of the present invention and a process of measuring a network status in a method for transmitting contents according to the exemplary embodiment of the present invention As illustrated in FIG. 1, the system for transmitting contents in a smart home environment according to an exemplary embodiment of the present invention includes various terminals 100, 110, 120, and 130 provided in a home, an access point AP 200 which connects wireless terminals 120 and 130 to a network, a hub 300 which connects the PC 110 or the AP 200 to the network, and a server 400 which provides contents transmission in a smart home environment according to an exemplary embodiment of the present invention.

In order to provide a high quality seamless streaming service to a user, a network status and a property of a terminal need to be recognized.

Therefore, in the system for transmitting contents in a smart home environment according to the exemplary embodiment of the present invention, the network status and the property of the terminal are first recognized.

As illustrated in FIG. 1, if various terminals such as the PC 110, the smart phone 120, or the tablet PC 130 are provided in a home, the server 400 recognizes a packet loss rate (PLR), delay, and an available bandwidth of each terminal. Information on the network status may be measured using various network status measuring tools. However, the information on the network status varies as time goes by so that the information needs to be periodically measured and updated.

Next, in order to transmit the contents adaptively to various terminal environments, the location and the property of the terminal are figured out.

Figure 2:
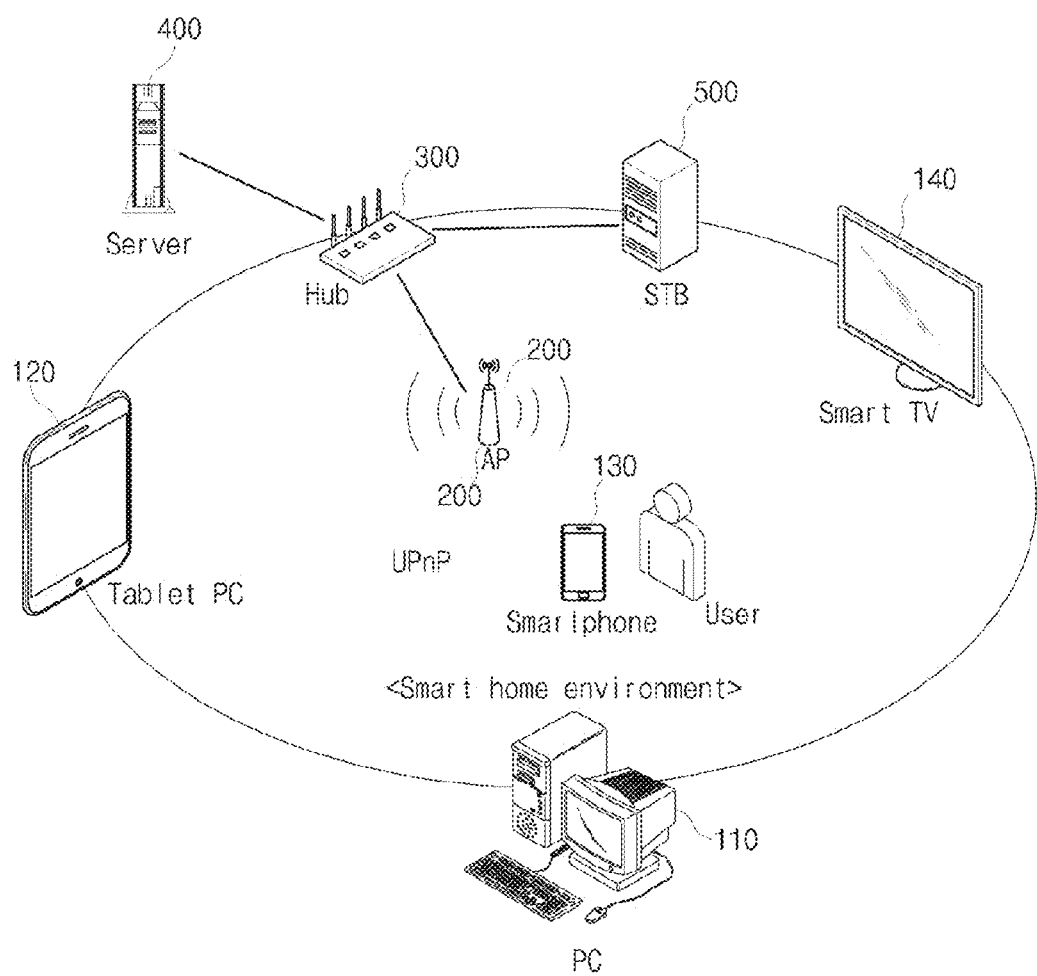
FIG. 2 illustrates a process of recognizing a location and a property of a terminal in the method for transmitting contents in a smart home environment according to the exemplary embodiment of the present invention.

FIG. 2 illustrates a process of recognizing a location and a property of a terminal in the method for transmitting contents in a smart home environment according to the exemplary embodiment of the present invention.

As illustrated in FIG. 2, the location and the property of the terminal are basically recognized based on a UPnP (universal plug and play) technology.

The location of the terminal is obtained from Description (Profile) of UPnP, where physical location information of the terminal is inputted as initial information of the terminal under the assumption that the location is fixed. The server uses the information to recognize the location of the terminal. However, a method for obtaining the location of the terminal is not limited thereto, but the location of the terminal may be obtained by other method.

Further, information on a property of the terminal may include a type of terminals (a tablet PC, a smart phone, or a PC), a resolution (QVGA, WQVGA, WXGA, SXGA, UXGA, WUXGA, or 2K), a performance of a CPU (i-3, i-5, or i-7), a storage size (16 GB, 32 GB, 64 GB, 128 GB, 1 TB, or 2 TB).

Now, the terminal information is displayed on a screen of the terminal through which a user is currently reproducing contents based on the collected information on the network status, the location of the terminal, and information on the property of the terminal.

Figure 3:
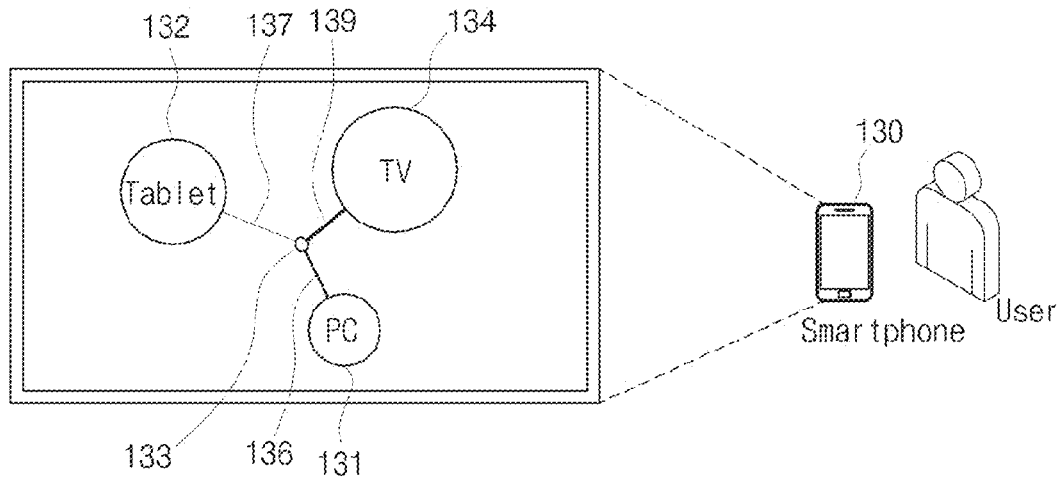
FIG. 3 illustrates an example of a screen which is displayed on a user terminal in the method for transmitting contents in a smart home environment according to the exemplary embodiment of the present invention.

FIG. 3 illustrates an example of a screen which is displayed on a user terminal in the method for transmitting contents in a smart home environment according to the exemplary embodiment of the present invention.

As illustrated in FIG. 3, other terminals 131, 132, and 134 in the smart home environment which can seamlessly reproduce the contents are displayed with respect to a user terminal 133 which is currently displaying the contents.

For example, each terminal may be displayed as a circle and a location of the circle may indicate a location of each terminal located in home and a size of the circle may indicate a resolution of the terminal. Further, connection lines 136, 137, and 139 with the circles are displayed and a thickness of the connection line indicates a status of the measured available bandwidth. By doing this, the user may intuitively understand terminals to which the contents can be moved and thus select a desired terminal.

When the user touches an icon (circle) of a terminal to which the contents will be moved, the contents move to the terminal. When the contents move, a resolution and a property of the contents of a media are adaptively adjusted based on the information on the terminal.

Figure 4:
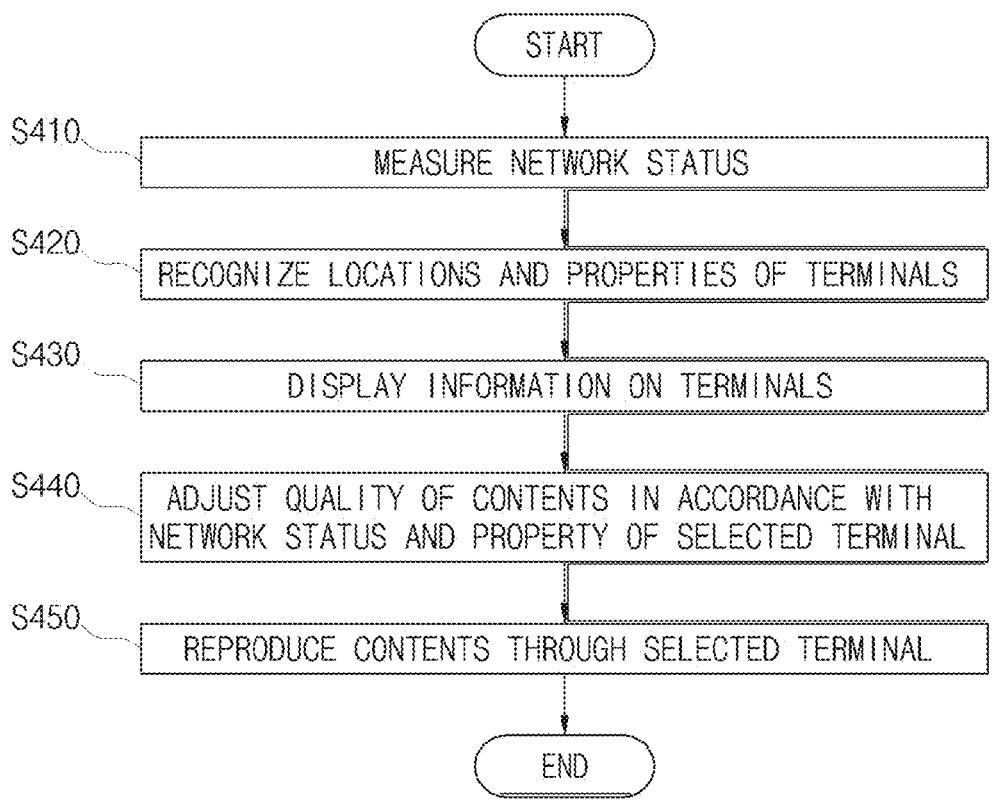
FIG. 4 is a flowchart illustrating the method for transmitting contents in a smart home environment according to the exemplary embodiment of the present invention.

FIG. 4 is a flowchart illustrating the method for transmitting contents in a smart home environment according to the exemplary embodiment of the present invention.

As illustrated in FIG. 4, network statuses of various terminal devices are measured using various network status measuring tools (S410) and the location and property of each of the terminals are recognized using a UPnP service (S420).

Based on the network status and the information on the terminal obtained through steps S410 and S420, information of a terminal, which is capable of seamlessly reproducing the contents, is displayed on a screen of the mobile terminal 130 through which a user is currently reproducing the contents (S430).

If the user selects any one of the displayed terminals, a quality of the contents is adjusted in accordance with the network status and the property of the selected terminal (S440), and thus the contents are seamlessly reproduced through the selected terminal (S450).

According to the method for transmitting contents in a smart home environment according to an exemplary embodiment of the present invention, when the user enters a specific space (for example, home) and thus a terminal through which the user is currently reproducing the contents enters a home network, the method may be automatically performed and the contents may be seamlessly reproduced on another terminal in accordance with the selection of the user. Further, even when the user moves another space in the home (for example, moves from a living room to a bedroom), the contents may be seamlessly reproduced through another terminal using the method for transmitting contents in a smart home environment according to the exemplary embodiment of the present invention.

According to the present invention, when the contents are desired to be moved or shared, information on the network status, the location of the terminal, and the property of the terminal are collected and UI/UX (user interface/user experience) is provided based on the collected information on the network status, the location of the terminal, and the property of the terminal so that it is possible to provide high convenience of the user.

Further, the contents may be moved or shared not only through a specific mobile terminal but also through various terminals in a smart home environment.

Further, the contents may be moved based on collected various information so that it is possible to seamlessly reproduce the contents and provide a user customized service A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for transmitting contents in a smart home environment configured by a home network, the method comprising:

measuring, by a server, a network status of a terminal device in relation to a mobile terminal, the terminal device being included in the home network and capable of reproducing the contents, the mobile terminal being currently reproducing the contents;

recognizing, by the mobile terminal, terminal information including a location and a property of the terminal device; and displaying, on a screen of the mobile terminal, graphical elements that respectively correspond to the terminal device, the network status, and the location of the terminal device that is recognized based on a network protocol, wherein the displaying comprises displaying the terminal device as a circle on the screen, wherein a location of the circle indicates a location of the terminal device located at home, a size of the circle indicates a resolution of the terminal device, and a thickness of a connection line connected to the circle indicates a status of bandwidth available to the terminal device.

2. The method of claim 1, further comprising:

in response to the displayed terminal device being selected, adjusting a quality of the contents in accordance with the network status and the terminal information of the selected terminal device.

3. The method of claim 2, further comprising:

reproducing the contents having quality adjusted in accordance with the network status and the terminal information of the selected terminal device.

4. The method of claim 1, wherein the network protocol is Universal Play and Plug (UPnP), and the location is a relative location of the terminal device in relation to the mobile terminal.

5. The method of claim 1, wherein the property of the terminal device includes a type, the resolution, a performance of a central processing unit (CPU), or a storage size of the terminal device.

6. The method of claim 5, wherein the displaying the terminal device comprises displaying the terminal device with a size which varies depending on the resolution of the terminal device.

7. The method of claim 1, wherein the network status includes a packet loss rate, delay, or the available bandwidth.

8. The method of claim 7, wherein the visual information of the network status corresponds to the connection line which connects the mobile terminal with the terminal device displayed on the screen of the mobile terminal, and the thickness of the line varies in accordance with the network status of the terminal device.

9. The method of claim 1, wherein the displaying the terminal device comprises displaying, on the screen at the same time, a plurality of terminal devices comprising the terminal device, the mobile terminal, and relative positions of the plurality of terminal devices with respect to the mobile terminal, and visualized network status information of the plurality of terminal devices comprising the visual information.

* * * * *